United States Patent [19]
White

[11] 3,949,483
[45] Apr. 13, 1976

[54] COMPASS
[75] Inventor: Wilfrid Gordon White, Dover, Mass.
[73] Assignee: Optimum Inc., Dover, Mass.
[22] Filed: Sept. 9, 1974
[21] Appl. No.: 504,165

[52] U.S. Cl. ............................. 33/364; 33/355 R
[51] Int. Cl.² ........................................ G01C 17/08
[58] Field of Search ......... 33/359, 364, 355, 355 D, 33/358, 357

[56] References Cited
UNITED STATES PATENTS

| | | |
|---|---|---|
| 3,261,103 | 7/1966 | Bosland et al. .......................... 33/359 |
| 3,473,234 | 10/1969 | Kjellstrom et al. ..................... 33/364 |

*Primary Examiner*—William D. Martin, Jr.

[57] ABSTRACT

Spatially adaptable support means for orienting the compass card immersed in damping fluid within a spherical housing of a magnetic compass to a horizontal plane during installation in any given mounting surface, comprising a movable compass card support unit and means for adjustably selectively positioning the support unit relative to the mounting plane and the sphere thereby positioning the card in its horizontal plane.

12 Claims, 6 Drawing Figures

// COMPASS

BACKGROUND OF THE INVENTION

This invention relates to an adjustment means for orienting to a horizontal plane, the structure supporting compass cards immersed in damping fluid of magnetic compasses of the class enclosed in a spherical housing.

U.S. Pat. No. 3,481,045 discloses an example of a spherical compass with double-axis internal gimballing and a member providing damping against roll and pitch supportive of lubber and athwartship lines maintained perpendicular to the compass card. In recent years, location and mounting of such compasses have changed drastically from a true pedestal type binnacle mount, where the compass is installed horizontally, to angled shelf-mounted units and, most recently, to athwartship bulkhead mountings which may be vertical or pitched at some unspecified angle to the horizontal. At present, internally gimballed compasses must be preconstructed to adapt properly to surface mounting at any angle to the horizontal, because in order for the compass card to function properly, it must, when the vessel is at rest, be lying in a horizontal plane. Several presently available spherical compasses, providing double axis gimballing mechanisms having the trunnions of the outer gimball lying in the athwartship plane, additionally give rise to substantial cardanic error when the vessel is sailing at a considerable angle of heel and encounters pitching motion. For example: if the angle of heel is 45°, a pitch angle of but 15° will produce a displacement of the forward lubber line relative to the compass card of several degrees; in the extreme, if an angle of heel were 90°, any pitch would produce up to 180° of lubber line displacement. If the compass is installed at an angle from horizontal with its outer trunnions in the fore-aft plane, the same error is encountered.

SUMMARY OF THE INVENTION

Compasses embodying this invention overcome or greatly diminish the cardanic error described above, may be mass produced and can be adjusted during installation to adapt to any mounting site, assuring that the outer trunnions of the double-axis gimball, and hence the compasss card, will lie in a horizontal plane.

In general, the invention features means for adjustably positioning a compass card into a horizontal plane in a spherical compass mounted at any angle, from horizontal to vertical, comprising: a moveable compass card support unit mounted within the sphere and; means for adjustably, selectively positioning the unit, and hence the card, relative to the mounting site.

In one preferred embodiment, wherein the sphere is filled with damping fluid, the means for adjustably positioning the unit comprises: a hemispherical bowl having an adjustment slit extending at least 90° along an arc perpendicular to the equator of the bowl (the equator lying in a plane parallel to the compass mounting plane); securing means comprising interfitted rotatably tightenable threaded members attached to the support unit and protruding through the slit; and a pliable boot sealed to the exterior of the bowl, enclosing the slit and serving as an expansion chamber for the fluid. In this embodiment, the arcuate adjustment motion of the support unit within the bowl is controlled by either interfitting guiding surfaces on the bowl and support unit, or athwartship pivots connecting the support unit with the bowl at its equator.

In a second preferred embodiment, the support unit is adjustably rotated, enabling the compass to be mounted in either a horizontal or vertical mounting plane. The support unit comprises a semicircular band having a pin protruding from a point 45° from its midpoint through a bore in the bowl located in the fore-aft plane and 45° below its equator. Adjustment is accomplished by rotating the unit about the pin to a horizontal mounting position, wherein a detent, located to meet a first detent receiving hole, rigidly fixes the support unit, or to a vertical mounting position, where the detent is received by a second receiving hole.

Other advantages and features of the invention will be apparent from the description and drawings herein of the preferred embodiments thereof.

DESCRIPTION OF THE PREFERRED EMBODIMENTS

Figure 1:
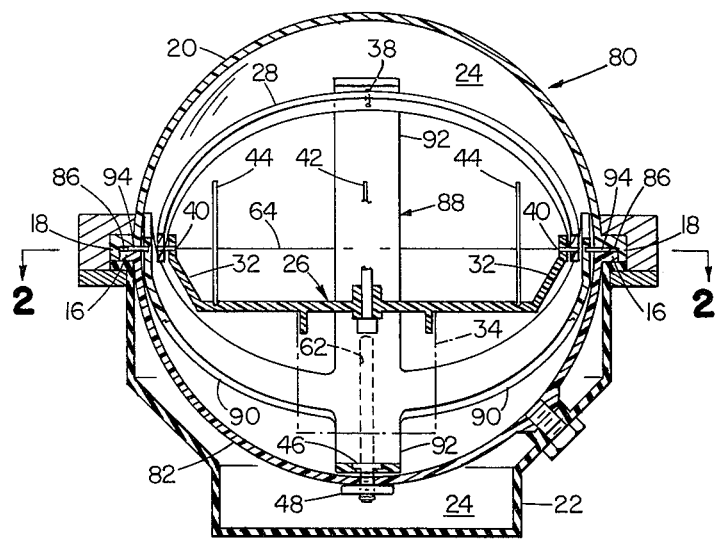
FIG. 1 is a vertical section of a compass constructed in accordance with a first embodiment of the invention.
Figure 2:
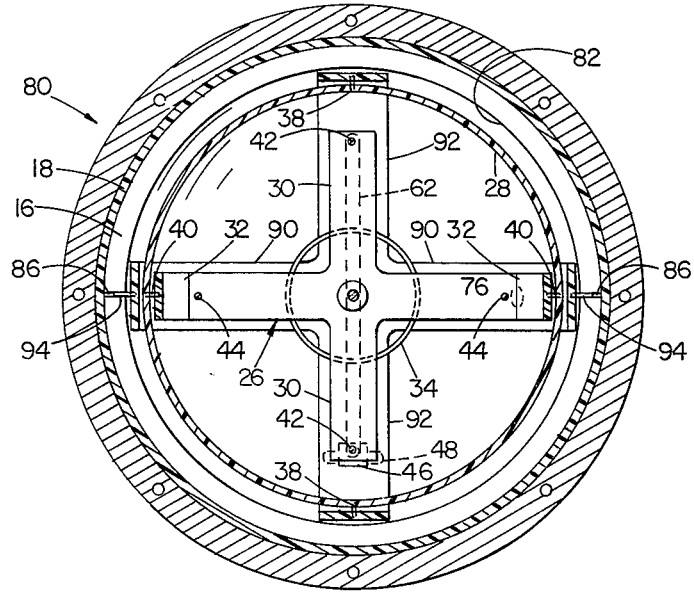
FIG. 2 is a cross section of the compass of FIG. 1 taken along the mounting plane after adjustment for horizontal mounting.

Referring to FIG. 1, spherical compass 80 has a bowl 82 with flange 16 secured to flange 18 of cover 20 by screws (see FIG. 2). Pliable boot 22 sealed at flange 16 prevents leakage of fluid 24 and allows for its thermal expansion.

Card support structure generally designated 26 is suspended by trunnions 38 from adjustable support unit 88 and comprises gimball ring 28, athwartship lubber line support arm 30 (FIG. 2) lubber line suspension arm 32 and damping web 34. Lubber line suspension arm 32 is fastened to gimball ring 28 by inner trunnions 40 for rotation about the fore-aft axis. Damping web 34 hangs from the athwartship and lubber line support arms, 30 and 32. The compass card (not shown) is supported by a shaft and jewel bearing (not shown) extending upwards from the intersection of the athwartship and lubber line support arms, 30 and 32, and normally lies in the plane of gimball ring 28 adjacent to athwartship lines 42 and lubber lines 44. Since the mounting plane of the compass after installation will always be parallel to the equator 64 of the spherical compass, it will be appreciated that by adjusting support unit 88 before mounting, it will always be possible to orient gimball ring 28, and hence the whole card support structure 26 to a horizontal plane.

This adjustment is accomplished by means comprising bowl 82 which has a slit 62 extending 90° along an arc perpendicular to its equator 64 and a pair of pivot receiving points 86 spaced 90° from the arc of slit 62 on equator 64, and adjustable unit 88, comprising two semi-circular bands 90 and 92 attached at their midpoints at right angles to each other. Band 90 has 2 pivots 94 projecting into pivot receiving points 86 about which unit 88 may be rotatably adjusted. Band 92 has a fixed bolt 46 extending through slit 62 with a nut 48, and functions to support the card support structure 26 through trunnions 38.

In operation, during installation of the compass, the angle to horizontal is measured, nut 48 is loosened through boot 22 (see FIG. 3) and adjustable unit 88 is rotated about pivots 94 until gimball ring 28, and hence card support structure 26, will lie in a horizontal plane when the compass is installed at the measured angle to horizontal in the mounting site. After nut 48 is tightened, the compass is mounted.

Figure 3:
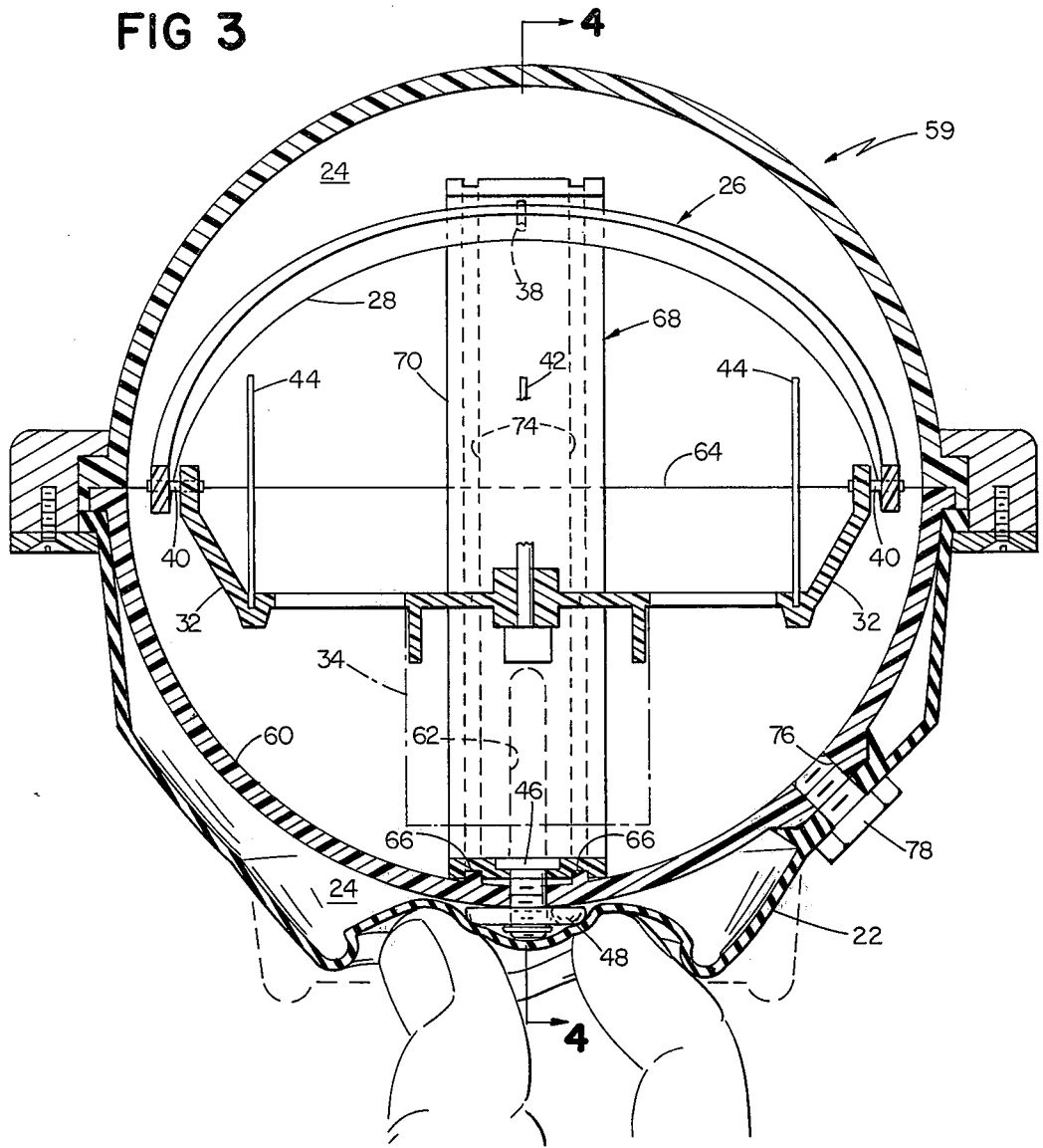
FIG. 3 is a cross section of a compass constructed in accordance with a second embodiment of the invention while being adjusted.
Figure 4:
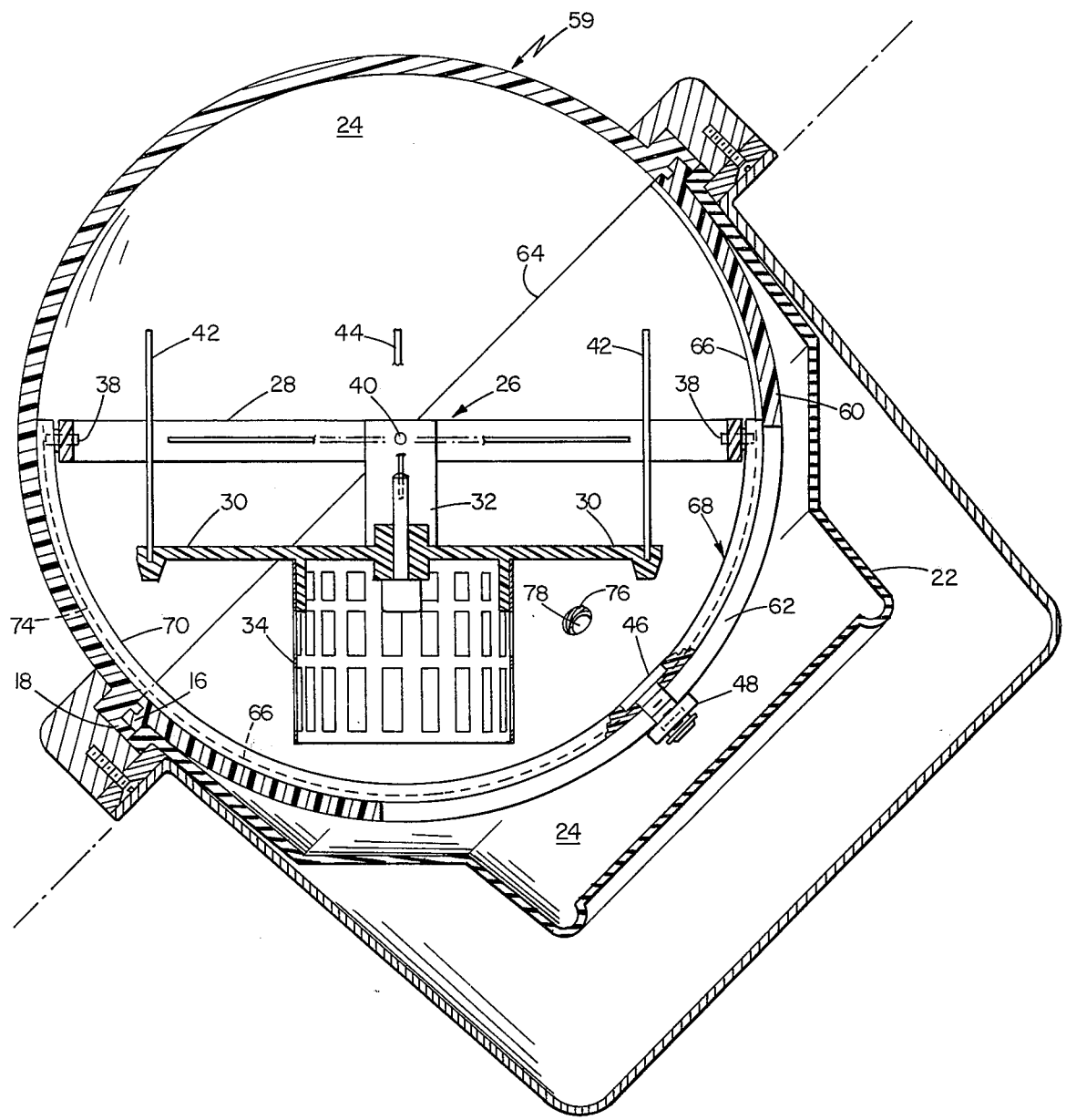
FIG. 4 is a cross section of the compass of FIG. 3 taken along line 4—4 of FIG. 3, after adjustment is completed and the compass is mounted in a 45° plane.

Referring to FIGS. 3 and 4, a second embodiment 59 of the invention is shown having a bowl 60 with a slit 62 identical to the slit of the first embodiment, and a pair of guiding ridges 66 running parallel to the slit. Adjustable unit 68 comprises a single semi-circular band 70 supporting trunnions 38 of support structure 26, a fixed bolt 46 extending through slot 62, with a nut 48, and a pair of guiding grooves 74 interfitting with ridges 66.

The operation of this embodiment is identical to that of the first, except that adjustable support unit 62 is slid along the guides into the desired position rather than rotated about pivots. For example, FIG. 4 shows a compass installed in a mounting 45° from the horizontal. It will be appreciated that adjustable support unit 68 has been secured to a position which fixes support structure 26 in a horizontal plane.

Figure 5:
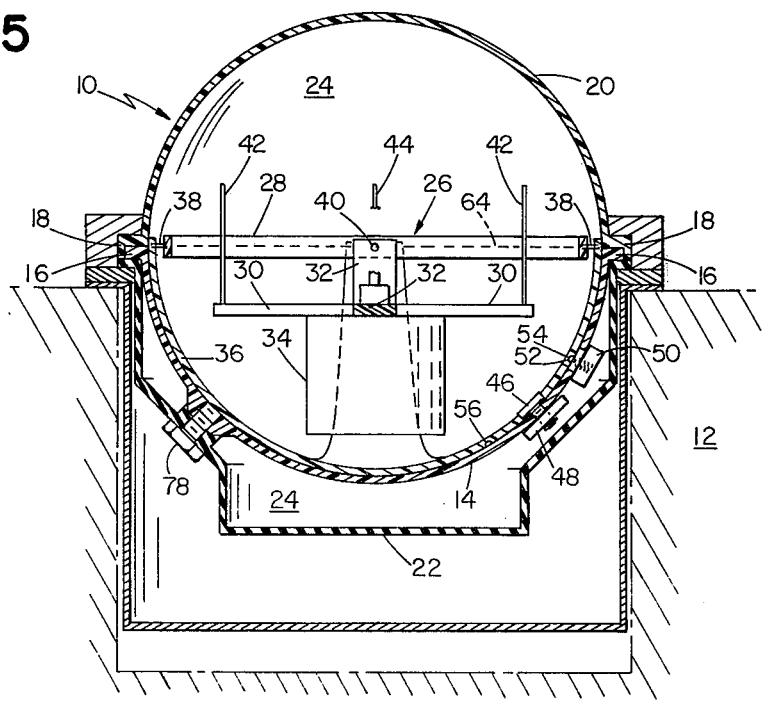
FIG. 5 is a cross section of a compass constructed in accordance with a third embodiment of the invention mounted in a horizontal binnacle.

Referring to FIG. 5, spherical compass 10 is installed in binnacle 12. Bowl 14 has a bore spaced 45° from the equator of the sphere through which fixed bolt 46 protrudes. Detent 50 has a spring loaded ball 52 and lies in the same arc of bowl 14 as bolt 46. Adjustable unit 36 comprises two semi-circular bands fitting within bowl 14 and attached at right angles to each other at their midpoints. Detent receiving holes 54, 56 and fixed bolt 46 lie in the arc bisecting the athwartship band of unit 36.

Figure 6:
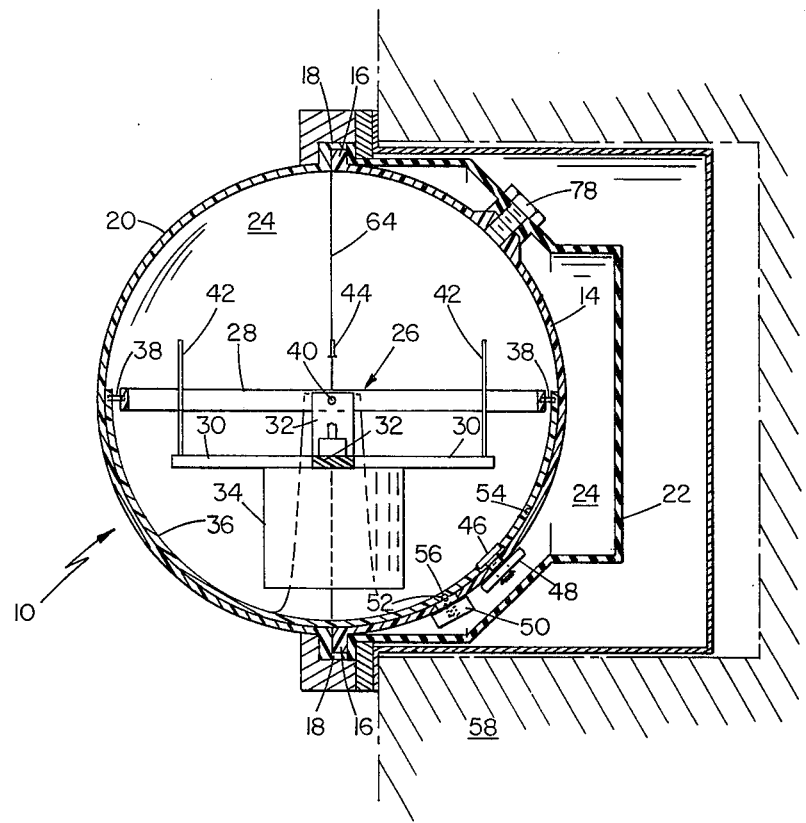
FIG. 6 is a cross section of the compass of FIG. 5 having been adjusted and mounted in a vertical bulkhead.

In operation, during installation of the compass, the adjustable member 36 of this embodiment must be pre-set to adapt to either a horizontal mounting, such as in binnacle 12 of FIG. 5 or to a vertical mounting, such as in bulkhead 58 of FIG. 6. The adjustment is accomplished by loosening nut 48 through boot 22, rotating member 36 about bolt 46 within the housing until it is detended in either the horizontal mounting position (i.e., in detent receiving hole 54, FIG. 5), or in the vertical mounting position (detent receiving hole 56, FIG. 6). The nut is then tightened and the compass installed.

Other embodiments are within the following claims.

What is claimed is:

1. In a spherical compass having, positioned in a horizontal plane within a pair of hemispherical bowls joined together parallel to a compass mounting plane, double axis gimball means having lubber lines and a rotatably mounted compass card supported therein,
    support means for adjustably positioning said double axis gimball means into its horizontal plane within said bowls for selective mounting of said gimball means with its compsss mounting plane oriented at an angle between the horizontal and vertical,
    said support means comprising:
        a movable double axis grimball means support unit mounted within said bowls and
        adjustment means for adjustably, selectively positioning said support unit relative to said bowls thereby orienting said gimball means, lubber lines and compass card to a horizontal plane.

2. The support means of claim 1 wherein said adjustment means for adjustably, selectively positioning said support unit includes:
    means defining an opening in one of said bowls and
    securing means mounted on said support unit and extending outwardly therefrom through said opening for securing said support unit in an adjustably fixed position.

3. The support means of claim 2 wherein said means defining an opening is a bore and
    said securing means is rotatable in said bore when unsecured thereby enabling rotational adjustable positioning of said support unit.

4. In a spherical compass having a compass card positioned in a horizontal plane within a pair of hemispherical bowls filled with damping fluid and joined together parallel to a compass mounting plane,
    support means for adjustably positioning said compass card into its horizontal plane within said bowls thereby enabling selective mounting of said compass with its mounting plane oriented at an angle between the horizontal and vertical comprising:
    a movable compass card support unit mounted within said bowls;
    means defining an opening in one of said bowls;
    a pliable boot sealed to the exterior of said one bowl and;
    securing means mounted on said support unit and extending outwardly therefrom through said opening within said boot for securing said support unit in an adjustably fixed position.

5. Spatially adaptable support means for orienting to a horizontal plane the compass card of magnetic compasses of the class having a spherical housing filled with damping fluid, comprising:
    a hemispherical bowl having an adjustment slit extending at least 90° along an arc perpendicular to the equator of said bowl, the plane of said equator being parallel to a compass mounting plane;
    a unit fitting within said bowl for supporting said card;
    a pliable boot sealed to the exterior of said bowl and;
    securing means extending from said unit through said slit within said boot;
    whereby said card may be slidably adjusted and rigidly held at any angle up to 90° to said mounting plane.

6. The means of claim 5 wherein said bowl further has two pivot receiving points lying on said equator and said support unit further has two pivots fitting said pivot receiving points upon which it may be rotated.

7. The means of claim 5 wherein said bowl further has a guiding surface parallel to said arc on the interior of said bowl and said support unit further has a guiding point interfitting with said guiding surface along which it may be slid.

8. The means of claim 5 wherein said securing means comprises interfitted rotatably tightenable threaded members.

9. Spatially adaptable support means for orienting to a horizontal plane the card of magnetic compasses of the class having a spherical housing filled with damping fluid, comprising:
- a hemispherical bowl having a bore lying in an arc perpendicular to the equator of said bowl, 75° from said equator, and first cooperating detent means lying in said arc spaced less than 45° from said bore, said equator being parallel to a compass mounting plane;
- a pliable boot sealed to the exterior of said bowl and enclosing said bore and;
- a unit fitting within said bowl for supporting said card comprising a semicircular band rotatable about a pin projecting 45° from the midpoint of said band through said bore and having second cooperating detent means spaced on opposite sides of said pin on said arc bisecting said band at a distance equal to that between said hole and said first cooperating detent means,
- whereby, by rotating said unit by means of said pin, said card support structure may be adjusted and rigidly detented either in a plane parallel to said compass mounting plane or in a plane 90° therefrom.

10. The support unit of claim 9 wherein said unit further comprises a second band joined at its midpoint to the midpoint of said first band at an angle to said bisecting arc of said first band.

11. In a spherical compass having a compass card positioned in a horizontal plane within a pair of hemispherical bowls joined together parallel to a compass mounting plane,
- support means for adjustably positioning said compass card into its horizontal plane within said bowls for selective mounting of said compass card with its mounting plane oriented at an angle between the horizontal and vertical, comprising:
- a movable compass card support unit mounted within said bowls and,
- adjustment means for adjustably, selectively positioning said support unit relative to said bowls thereby orienting said compass card to its horizontal plane, including
- means defining an opening in one of said bowls and
- securing means mounted on said support unit and extending outwardly therefrom through said opening for securing said support unit in an adjustably fixed position.

12. The support means of claim 2 wherein said means defining said opening is a slot extending in an arc of at least 90° and
said securing means is movable along said slot when unsecured to adjustably position said support unit.

* * * * *

UNITED STATES PATENT AND TRADEMARK OFFICE
CERTIFICATE OF CORRECTION

PATENT NO. : 3,949,483
DATED : April 13, 1976
INVENTOR(S) : Wilfrid Gordon White It is certified that error appears in the above-identified patent and that said Letters Patent are hereby corrected as shown below:

Column 3, line 66, "compsss" should be --compass--;

Column 4, line 1, "grimball" should be --gimball--;

line 15, "2" should be --11--;

Column 5, line 4, "75°" should be --45°--;

Column 6, line 22, "2" should be --11--.

Signed and Sealed this twenty-ninth Day of June 1976

[SEAL]

Attest:

RUTH C. MASON
*Attesting Officer*

C. MARSHALL DANN
*Commissioner of Patents and Trademarks*